Figure 1:
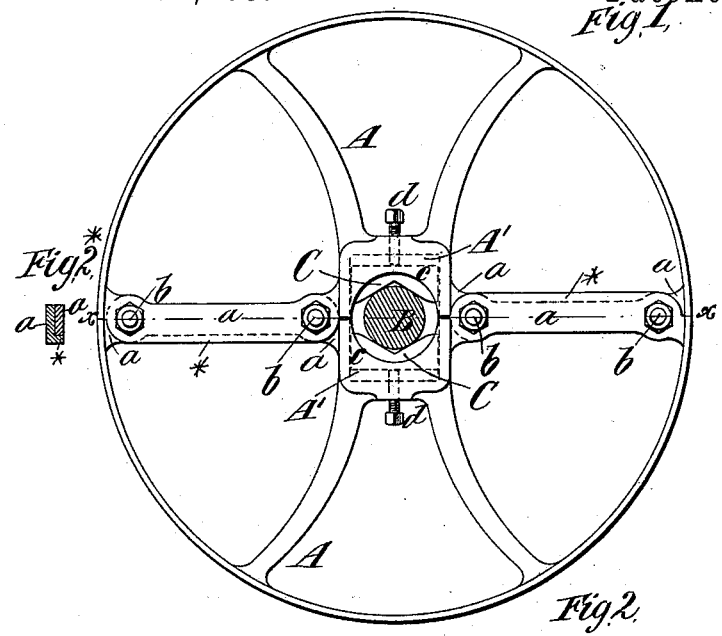

(No Model.) 2 Sheets—Sheet 1.

J. N. BALDWIN & T. O. STILES.
SPLIT PULLEY.

No. 297,339. Patented Apr. 22, 1884.

Witnesses:
Fred Haynes
Harry Bogert

Inventors:
John N. Baldwin
Thomas O. Stiles
by their Attys.
Brown & Hall

N. PETERS, Photo-Lithographer, Washington, D. C.

(No Model.) 2 Sheets—Sheet 2.
J. N. BALDWIN & T. O. STILES.
SPLIT PULLEY.
No. 297,339. Patented Apr. 22, 1884.
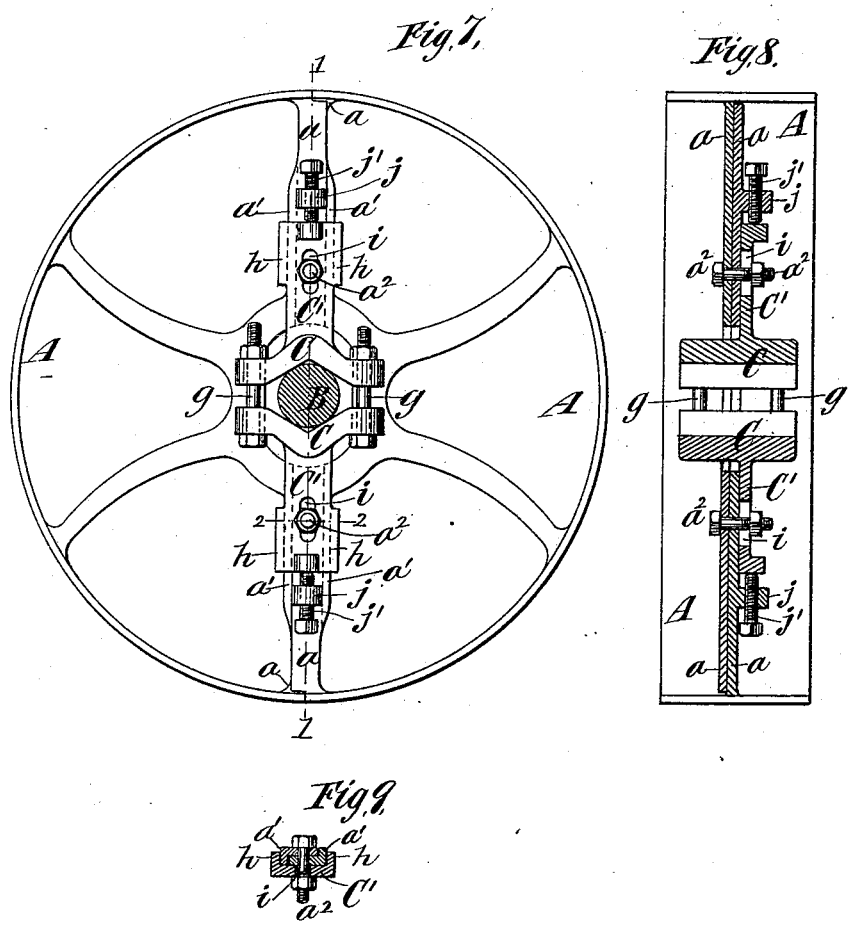
Witnesses:
Fred Haynes
Harry Bogert
Inventors:
John N. Baldwin
Thomas O. Stiles
by their Attys.
Brown & Hall

UNITED STATES PATENT OFFICE.

JOHN N. BALDWIN AND THOMAS O. STILES, OF BLOOMFIELD, NEW JERSEY.

SPLIT PULLEY.

SPECIFICATION forming part of Letters Patent No. 297,339, dated April 22, 1884.

Application filed February 25, 1884. (No model.)

*To all whom it may concern:*

Be it known that we, JOHN N. BALDWIN and THOMAS O. STILES, both of Bloomfield, in the county of Essex and State of New Jersey, have invented a new and useful Improvement in Split Pulleys, of which the following is a specification.

The object of our invention is to provide a split pulley which may be produced and sold at small cost, and which may be secured upon different sizes of shafting, so that it will run truly even if the shafting be out of true, and whether the shafting be finished or rough.

The invention consists, essentially, in the combination, with a split pulley the halves or sections of which may be separated to enable them to be placed on a shaft, of two clamps which have concave faces, and with which the halves or sections of the pulley are connected, and means whereby said clamps may be adjusted to and tightened upon opposite sides of a shaft, so as to hold the shaft between them.

The invention also consists in the combination, with a split pulley, of two clamps, with which the halves or sections of the pulley are connected, and bolts passing through the two clamps on opposite sides and independent of the pulley, whereby the clamps may be tightened upon a shaft.

The invention also consists in the combination, with the halves or sections of a split pulley having arms which are formed with the halves or sections of the pulley, and which lap on or over each other in planes transverse to the axis of the pulley, of bolts inserted through said lapping arms in a direction parallel with the axis of the pulley. In split pulleys as usually made, the arms which are bolted together to secure the halves or sections of the pulley together have their width or greatest dimension in a plane parallel with the axis of the pulley, and the bolts are inserted in a direction transverse to the axis of the pulley. In order to best resist strain, the arms of a pulley should have their width or greatest dimension in a plane transverse to the axis of the pulley, like the arms of ordinary solid pulleys; and by the above-described feature of our invention we enable the arms of a split pulley, through which the securing-bolts are inserted, to be so made that they will be best calculated to resist strain.

The invention also consists in novel combinations of parts and details of construction, which are hereinafter described, and set forth in the claims.

Figure 3:
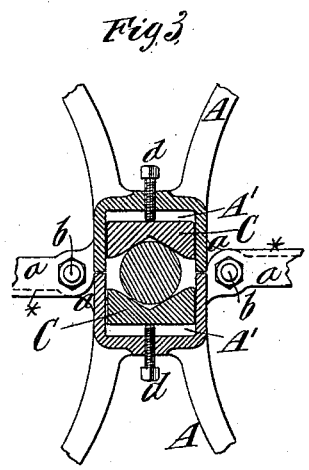
Figure 2:
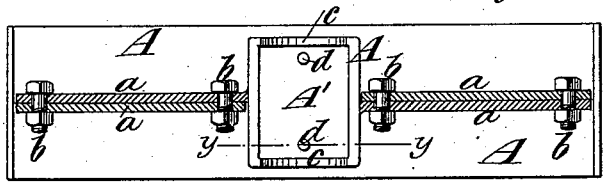
Figure 4:
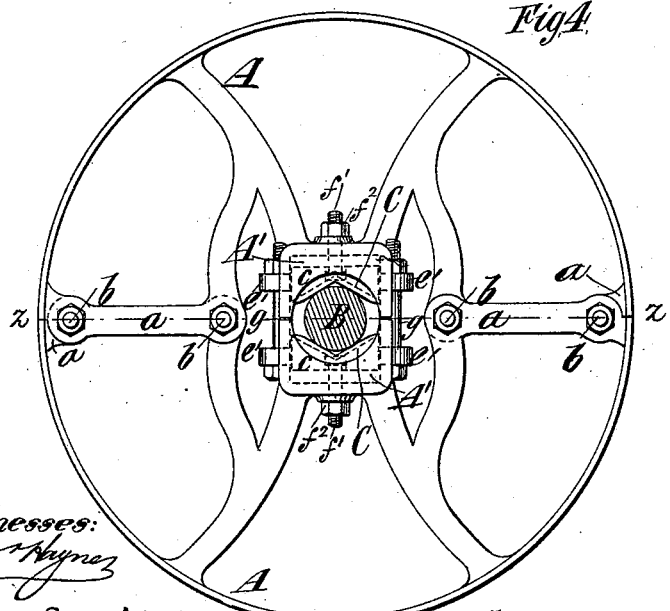
Figure 6:
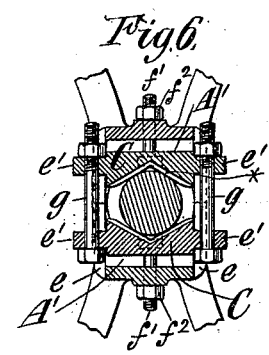
Figure 5:
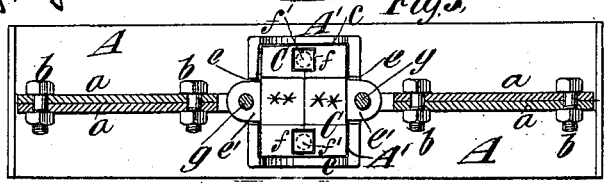

In the accompanying drawings, Figure 1 is a side view of a pulley embodying our invention and a transverse section of a shaft on which it is secured. Fig. 2 is a sectional view of the pulley on the plane of the dotted line $x\,x$, Fig. 1, which is the dividing-line of the pulley. Fig. 2* is a sectional view of the lapping arms of the pulley. Fig. 3 is a sectional view of the hub of the pulley, its clamps, and the shaft on which it is secured, on the plane of the dotted line $y\,y$, Fig. 2. Fig. 4 is a view similar to Fig. 1 of a pulley also embodying our invention. Fig. 5 is a sectional view on the plane of the dotted line $z\,z$, Fig. 4. Fig. 6 is a sectional view of the hub, the clamps, and the shaft on which the pulley shown in Fig. 4 is secured, in a plane transverse to the shaft. Fig. 7 is a side view of a pulley embodying a modification of our invention. Fig. 8 is a sectional view on the dotted line 1 1, Fig. 7; and Fig. 9 is a transverse section through the arms of the pulley on the dotted line 2 2, Fig. 7.

Similar letters of reference designate corresponding parts in all the figures.

Referring first to Figs. 1, 2, 2*, and 3, A A designate the halves or sections of the pulley, which are each formed with arms $a\,a$ at the point of connection between them. These arms lap on each other in a plane transverse to the axis of the pulley, and are secured together by bolts $b$, inserted through them in a direction parallel with the axis of the pulley. In each half A of the pulley is formed a cavity, A', and when the halves are bolted together there is formed a hub, in each end of which is an opening or eye, $c$, which is larger than the largest shaft on which the pulley is intended to be used. The shaft B here shown is smaller than said opening or eye, and the pulley itself has no bearing whatever on the shaft. The pulley is secured on the shaft B by means of two clamps, C C, which are alike, and which are connected with the halves of the pulley by fitting in the cavities A', formed therein. As here shown, each clamp C has an angular or V-shaped face, and therefore each clamp bears on the shaft on both sides of its center. Before the halves of the pulley are bolted together the clamps C C are placed in the cavities A' A'. The halves are then placed on the shaft B and secured together by the bolts b. In each half of the pulley are bolts d, inserted into tapped holes in the back of the cavity A', near opposite ends thereof, as shown in Fig. 2, and these bolts or screws bear on the back of the clamp C near its opposite ends. By tightening these screws d the two clamps are tightened upon the shaft B and caused to bite the same firmly, and by loosening certain of the screws and tightening others the pulley may be brought to a true position on the shaft, and will run truly whether the shaft be out of truth or not. One arm, a, of each pair has a rib, *, which laps over the other and takes the strain.

Referring now to Figs. 4, 5, and 6, the arms a a, with which the halves of the pulley A A are provided, do not extend clear to the hub of the pulley, as above described; but they have their width or greatest dimension and lap on each other in a plane transverse to the axis of the pulley, and are secured together by bolts b, inserted in a direction parallel with the axis of the pulley. The halves of this pulley have cavities or boxes A', substantially like those before described; but in opposite sides of each cavity are openings or slots e, and the clamps C have ears or laterally-projecting lugs e', which are received in said openings or slots, as best shown in Fig. 5. The clamps C C have in them, near opposite ends, bolt-holes f, in which are inserted bolts f', the bolts being inserted from the inner sides or faces of the clamps, and the bolt-heads being received in square sockets or countersinks in the faces of the clamps, whereby they are held against turning. The bolts f' pass through holes in the backs of the cavities A', and have nuts $f^2$ applied to them, as shown in Figs. 4 and 6. Bolts g are inserted through the ears or lugs e' of the clamps C on opposite sides of the shaft B, and serve to secure the clamps upon the shaft B. The clamps C C are here shown as having angular or V-shaped faces, and they are preferably recessed slightly, as shown at * *, in the middle of their length, in order to bring their points of bearing on the shaft near their ends. In applying this pulley to the shaft, the bolts f' are first inserted through the clamps C from the inner sides or faces thereof. The clamps are then applied to the shaft, and tightly secured or clamped thereon by the bolts g. The halves of the pulley are then placed on the clamps, and are secured to or connected with the clamps by the nuts $f^2$, and to each other by the bolts b.

Referring now to Figs. 7, 8, and 9, A A designate the halves of the pulley, which have arms lapping over each other, and having their width or greatest dimension in a plane transverse to the axis of the pulley, as best shown in Figs. 8 and 9. Throughout a portion of their length, at least, the arms a have ribs a', which prevent lateral motion, as shown in Fig. 9. At the center of the pulley is an eye or opening larger than any shaft B with which the pulley is intended to be used. C C designate the clamps, which are here shown as having angular or V-shaped faces, and which extend sufficiently far beyond the shaft B to receive through them bolts g on each side of the shaft, whereby they may be securely clamped on the said shaft. The two clamps have outwardly-extending arms C', which may be gibbed at the edges h, to receive the lapped arms a a of the pulley, and in which are slots i. Bolts $a^2$ are inserted through the lapped arms a a and through the slots i, and these bolts not only serve to secure the pulley to the clamps, but they also serve to hold the halves of the pulley together. On the arms a are ears or lugs j, through which are inserted set-screws j', which bear on the ends of the clamp-arms C'. By tightening and loosening the screws j', as may be necessary, the pulley may be centered on the shaft, and the bolts $a^2$ may then be tightened up to securely connect the halves of the pulley with the clamps.

In order to turn off the faces of our improved pulleys, they are mounted temporarily on the mandrel in the same way that they are secured on the shaft B, and they will therefore be true when applied to a shaft.

A pulley constructed as described is very simple, strong, and inexpensive of construction. It will fit shafting of different diameters—ranging, for example, from one and one-fourth inch to three inches diameter—and it may be very readily put up, taken down, and adjusted upon shafting of different diameters.

What we claim as our invention, and desire to secure by Letters Patent, is—

1. The combination, with a split pulley the sections of which may be separated to enable them to be placed on a shaft, of two clamps, with which the sections of the pulley are connected, and which have concave faces, and means whereby said clamps may be adjusted to and tightened upon the opposite sides of a shaft, to hold the shaft between their concave faces, substantially as herein described.

2. The combination, with a split pulley the sections of which may be separated to enable it to be placed on a shaft, of two clamps having angular or V-shaped faces, and with which the sections of the pulley are connected, and means whereby the clamps may be adjusted to and secured upon a shaft, substantially as herein described.

3. The combination, with a split pulley, of two clamps, with which the sections of the pulley are connected, and bolts passing through the two clamps on opposite sides and independent of the pulley, whereby the clamps may be tightened upon a shaft, substantially as herein described.

4. The combination, with the halves of a split pulley, of arms which are formed with the halves or sections, and which lap on or over each other in planes transverse to the axis of the pulley, and bolts inserted through said lapping arms in a direction parallel with the axis of the pulley, substantially as herein described.

5. The combination, with the halves or sections of a split pulley, of two clamps connected with the pulley, and having faces which are recessed or cut away between their ends, so as to obtain a bearing near each end, and means independent of the pulley for securing said clamps upon a shaft, substantially as herein described.

6. The combination, with the halves or sections of a split pulley, A A, each having a cavity or box, A', in which are openings or slots $e$, of the clamps C, provided with lugs or ears $e'$, extending through said openings or slots $e$, bolts $g$, passing through said lugs or ears, and serving as a means of tightening the clamps upon a shaft, and bolts for securing the halves or sections of the pulley to said clamps, substantially as herein described.

JOHN N. BALDWIN.
THOS. O. STILES.

Witnesses:
C. HALL,
FRED. HAYNES.